United States Patent [19]

Dubroca et al.

[11] Patent Number: 4,647,400

[45] Date of Patent: Mar. 3, 1987

[54] LUMINESCENT MATERIAL OR PHOSPHOR HAVING A SOLID MATRIX WITHIN WHICH IS DISTRIBUTED A FLUORESCENT COMPOUND, ITS PREPARATION PROCESS AND ITS USE IN A PHOTOVOLTAIC CELL

[75] Inventors: Claudie C. Dubroca, Talence; Agués Peirigua, Gazinet; Philippe Cazeau, Talence, all of France

[73] Assignee: Centre National de la Recherche Scientifique, Paris, France

[21] Appl. No.: 623,551

[22] Filed: Jun. 22, 1984

[30] Foreign Application Priority Data

Jun. 23, 1983 [FR] France ................. 83 10406

[51] Int. Cl.$^4$ ............................................. C09K 11/06
[52] U.S. Cl. ......................... 252/301.16; 252/301.34; 252/301.35
[58] Field of Search ..................... 252/301.34, 301.35, 252/301.16

[56] References Cited

U.S. PATENT DOCUMENTS 4,208,300 7/1980 Gravisse ................. 252/301.16

FOREIGN PATENT DOCUMENTS 2346858 10/1977 France ................. 252/301.16

OTHER PUBLICATIONS

Cazeau-Dubroca, C., *Journal of Luminescence*, vol. 29, pp. 349–364 (1984).
Cazeau-Dubroca, C., et al, *Chemical Physics Letters*, vol. 23, No. 3, pp. 397–399 (1973).
Dubroca, C., *Chemical Physics Letters*, vol. 15, No. 2, pp. 207–210 (1972).
Dubroca, C., et al, *Chemical Physics Letters*, vol. 24, No. 1, pp. 49–54 (1974).
Kadiri, A., et al, *Chemical Physics Letters*, vol. 65, No. 3, pp. 484–489 (1979).
*Chemical Abstracts*, vol. 99, p. 536, Abstract No. 79453(a), Cazeau-Dubroca et al, "Twisted Internal Charge-Transfer Fluorescence of p-(Dimethylamino)-benzonitrile in Rigid Matrix at Room Temperature", (1983).
*Chemical Abstracts*, vol. 95, p. 599, Abstract No. 178186(q), Cazeau-Dubroca et al, "New Temperature Effect on the 'Hidden Bond' of N,N-Dimethylaniline in a Polyethylene Matrix", (1981).
Zander, *Zeits. fur Naturf.* 24A (1969) #2, pp. 254–257.
Khalil et al., *Chemical Abstracts* 88 (1978) #143742.
Grabowski, *J. Luminescence*, vol. 18/19 (1979), pp. 420–424.
Grabowski et al., *Pure and Applied Chem.*, 55 (1983), pp. 245–252.

*Primary Examiner*—R. L. Andrews
*Attorney, Agent, or Firm*—Pearne, Gordon, McCoy & Granger

[57] ABSTRACT

The invention relates to a luminescent material or phosphor having a solid matrix within which is distributed a fluorescent compound, its preparation process and its use in a photovoltaic cell.

This luminescent material comprises a solid matrix having groups able to form hydrogen bonds, e.g. glass, polyamide or polyvinyl alcohol, and an organic compound which, by internal torsion, can have an excited state with charge transfer, distributed in the matrix, such as para-N,N-dimethylaminobenzonitrile (DMABN) or N,N-1-bimethylamino-4-cyanonaphtalene.

13 Claims, 4 Drawing Figures

LUMINESCENT MATERIAL OR PHOSPHOR HAVING A SOLID MATRIX WITHIN WHICH IS DISTRIBUTED A FLUORESCENT COMPOUND, ITS PREPARATION PROCESS AND ITS USE IN A PHOTOVOLTAIC CELL

BACKGROUND OF THE INVENTION

The present invention relates to novel luminescent materials or phosphors based on organic compounds having an internal torsion leading to an excited state by charge transfer to the lowest fluorescent level.

For some years now, research has been carried out on different organic molecules and it has been found that certain molecules dissolved in polar solvents can give rise to double fluorescence phenomenon when they have a structure with an internal torsion and can lead to a charge transfer.

Molecules of this type are more particularly described by W. RETTIG in Journal of Luminescence, 26, 1980, pp. 21–46; G. WERMUTH et al in Ber. Bunsenges, Phys. Chem. 85, 1981, pp. 64–70; Z. R. GRABOWSKI et al in Pure and Appl. Chem., Vol. 55, No. 2, pp. 245–252, 1983; and RETTIG et al, Chem. Phys., Letters, Vol. 87, No. 3, 1982, pp. 229–234.

The double fluorescence phenomenon of compounds of this type, is generally explained by the fact that in the excited state the molecule can be transformed by the internal rotation of a group, such as $-N(alkyl)_2$. Thus, this excited state corresponds to a conformation isomer which is able to transfer charges and hereinafter this excited state with internal torsion and charge transfer is called "TICT", an acronym for "twisted intramolecular charge transfer", used in the art to identify such phenomena.

Following research relating to these molecules dissolved in different solvents, it was found that the appearance of the excited state was aided by dipole-dipole interactions with the solvent and by reducing the viscosity of the solution. In addition, it has not hitherto been envisaged to include such molecules in solid matrixes.

SUMMARY OF THE INVENTION

The invention relates to a luminescent material having a solid matrix, in which is distributed an organic compound of this type.

The material according to the invention comprises a solid matrix having groups able to form hydrogen bonds and an organic compound able to have an excited state of the charge transfer and internal torsion type, distributed in said matrix. Generally, the material contains at least $15.10^{-5}\%$ by weight of the organic compounds.

As a result of the choice of the solid matrix, the material according to the invention has the feature of having improved fluorescence characteristics compared with those obtained with the same organic compound in solution.

Thus, there is an interaction between the solid matrix and the included organic compound. This interaction makes it possible to obtain improved properties, i.e. a fluorescence efficiency and a life considerably increased compared with those obtained when the molecules of the organic compound are in solution. This is due to a different conformation of the molecules in the solid matrix in the fundamental state, due to the hydrogen bond.

However, this interaction can only be obtained with certain materials, because it has been possible, to show that it resulted from the establishment of hydrogen bonds with the matrix. However, according to the invention, it is indispensable for the material of the matrix to have groups able to form hydrogen bonds, e.g. $-SH$, $-NH$ or $-OH$ groups.

This material can in particular be a polymer or copolymer e.g. obtained from alcohols, amines, amides, acids, esters, epoxides and/or thiols. Examples of such polymers are polyvinyl alcohol, polyamides and in particular the products marketed under the trade mark Nylon, polyesters and polyepoxides.

The material of the matrix can also be a mineral substance, e.g. a glass or hydrated salt. The matrix material may or may not be transparent. However, for certain applications, it is necessary to use a transparent material.

According to the invention, the organic compounds (TICT) which can be used are disubstituted benzene derivatives, substituted anthracene, phenanthrene or naphthalene derivatives, substituted pyridine derivatives, or polycyclic compounds having juxtaposed or branched cycles with optionally one or more heteroatoms such as N.

According to a first embodiment of the invention, the organic compound is in accordance with formula:

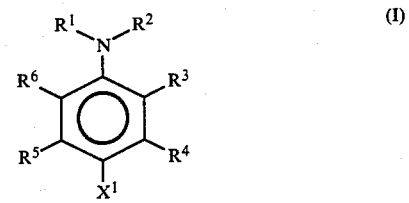

in which $R^1$ and $R^2$, which can be the same or different, represent an alkyl radical, $R^3$, $R^4$, $R^5$ and $R^6$, which can be the same or different, represent a hydrogen atom, a halogen atom, an alkyl radical or an alkoxy radical and $X^1$ represents $-C\equiv N$, $-COOR$,

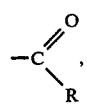

$-NO_2$ or

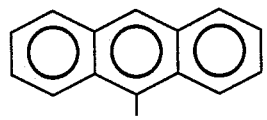

with R representing a hydrogen atom or an alkyl radical, or in which N, $R^1$ and $R^2$ together form a cyclic radical chosen from

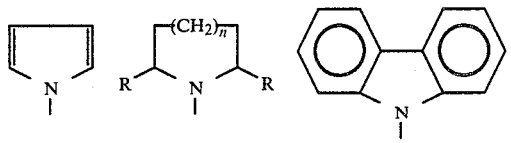
with R representing a hydrogen atom or an alkyl radical and n being equal to 2 or 3.
Examples of compounds of this type are those in accordance with the following formulas:
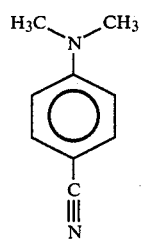 1
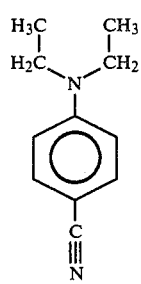 2
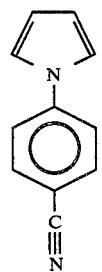 3
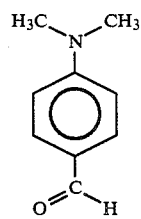 4
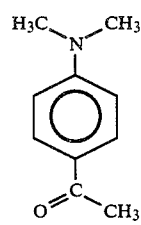 5
-continued
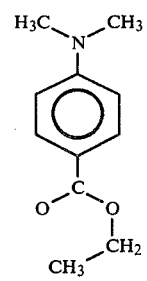 6
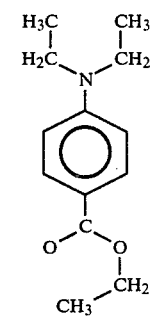 7
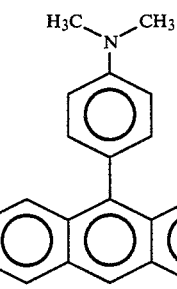 8
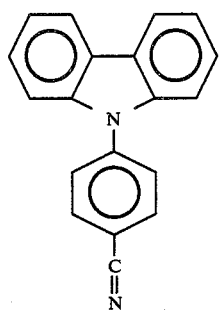 9
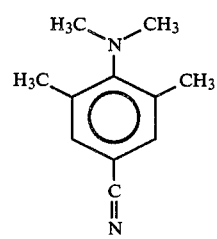 10

-continued

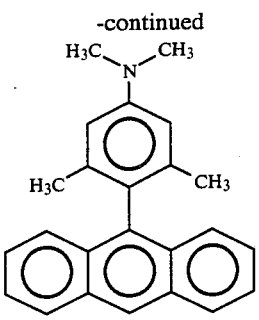
11

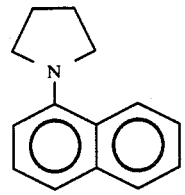
12

According to a second embodiment of the invention, the organic compound is a naphthalene derivative in accordance with the formula:

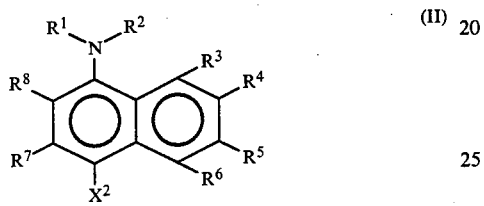
(II)

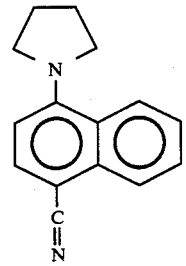
13 in which $R^1$ and $R^2$, which can be the same or different, represent an alkyl radical, $R^3$, $R^4$, $R^5$, $R^6$, $R^7$ and $R^8$, which can be the same or different, represent a hydrogen atom, a halogen, an alkyl radical or an alkoxy radical and $X^2$ represents a hydrogen atom —CN, —COOR,

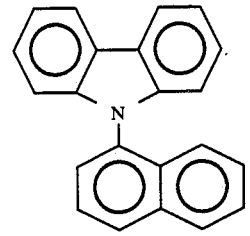
14

—NO₂ or

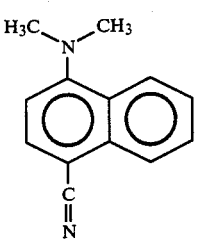
15

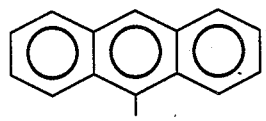

According to a third embodiment of the invention, the organic compound is an anthracene derivative which is in accordance with the formula:

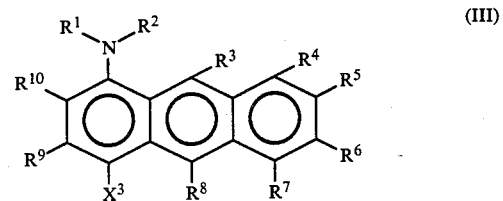
(III)

with R representing a hydrogen atom or an alkyl radical, or in which N, $R^1$ and $R^2$ can also together form a cyclic radical chosen from among:

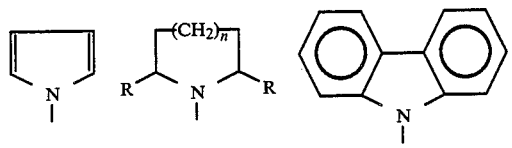

in which $R^1$ and $R^2$, which can be the same or different, represent an alkyl radica, $R^3$, $R^4$, $R^5$, $R^6$, $R^7$, $R^8$, $R^9$ and $R^{10}$ which, can be the same or different, represent a hydrogen atom, a halogen atom, an alkyl radical or an alkoxy radical and $X^3$ represents a hydrogen atom —CN, —COOR,

with R representing a hydrogen atom or an alkyl radical and n being equal to 2 or 3, provided that $X^2$ does not represent a hydrogen atom when $R^1$ and $R^2$ are alkyls.

Examples of compounds of this type are those in accordance with the following formulas:

—NO₂ or

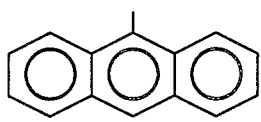

with R representing a hydrogen atom or an alkyl radical, or in which N, $R^1$ and $R^2$ can together form a cyclic radical chosen from among:

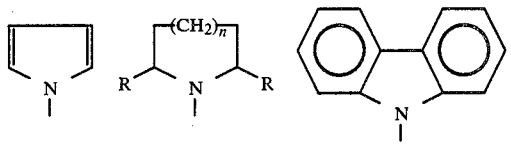

with R representing a hydrogen atom or an alkyl radical and n being equal to 2 or 3 provided that $X^3$ is not a hydrogen atom when $R^1$ and $R^2$ are alkyls.

According to a fourth embodiment of the invention, the organic compound is a derivative in accordance with the formula:

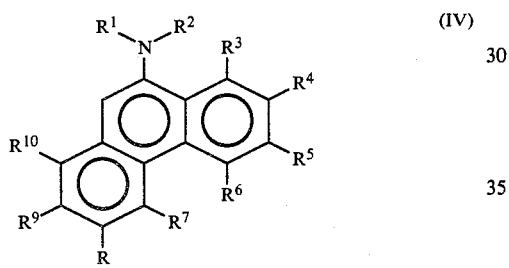

(IV)

in which $R^1$ and $R^2$, which can be the same or different, represent an alkyl radical, $R^3$, $R^4$, $R^5$, $R^6$, $R^7$, $R^8$, $R^9$ and $R^{10}$ represent a hydrogen atom, a halogen atom, an alkyl radical or an alkoxy radical, $X^4$ represents a hydrogen atom —CN, —COOR,

or $NO_2$ with R representing a hydrogen atom or an alkyl radical, or in which N, $R^1$ and $R^2$ together form a cyclic radical chosen from among:

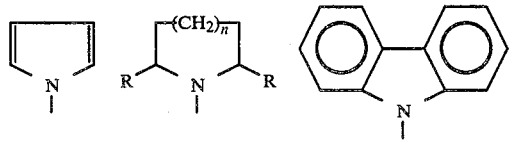

with R representing a hydrogen atom, or an alkyl radical and n being equal to 2 or 3, provided that $X^4$ is not hydrogen when $R^1$ and $R^2$ are alkyls.

An example of such a compound is in accordance with the following formula:

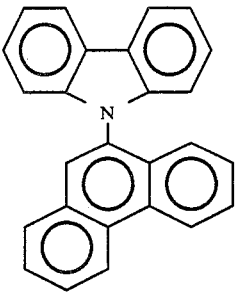

According to the invention, it is also possible to use compounds in accordance with the formulas:

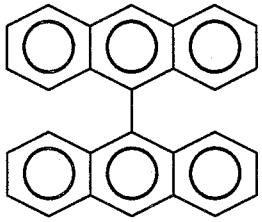

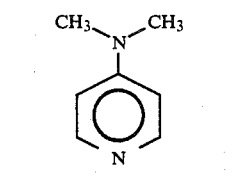

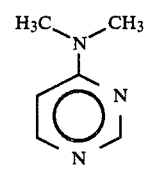

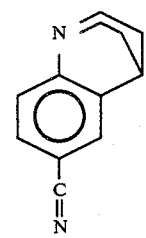

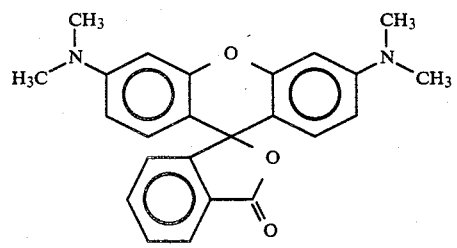

or their derivatives substituted by an alkyl or an alkoxy.

The alkyl or alkoxy radicals used as substituents in the organic compounds described hereinbefore generally have 1 to 4 carbon atoms.

According to the invention, all or part of the hydrogen atoms of the organic compound can be replaced by deuterium atoms. In the same way, it is possible to include in the solid matrix heavy atoms such as deuterium and iodide introduced in the form of heavy water or alkyl iodide. Thus, the presence of heavy atoms reinforces the TICT effect.

It is also possible to bring about a bathochromic effect of the TICT fluorescence by adding traces of a polar solvent, such as acetonitrile.

Moreover, according to an advantageous feature of the invention, the phosphor incorporates traces of at least one compound chosen in the group including heavy water, alkyl iodides and polar solvents.

The organic compounds used in the invention are known compounds, which can be prepared by conventional processes. It is in particular possible to prepare these compounds by using the process given by H. SUHR, LIEBIGS Annalen, 687, 1965.

In order to prepare the material according to the invention, the organic compound is introduced into the matrix, either during the preparation or during the shaping of the matrix, or following shaping by adsorption of the compound into the matrix from a solution thereof, followed by an evaporation of the solvent from the solution. It is also possible to introduce the compound into the matrix by dry route procedures, e.g. in the vapour phase.

Generally, the phosphor according to the invention is in the form of a thin film deposited on a substrate. The substrates used can be made from metal, plastic, glass, ceramics or the like, but are generally made from glass.

Preferably, according to the invention, when the matrix is a polymer or copolymer, the TICT-type organic compound is introduced during the formation of the polymer or copolymer film. In this case, the process consists of:

(a) preparing a solution of the polymer or copolymer forming the matrix and the organic compound by dissolving in a solvent, (b) bringing the solution into the form of a film by deposition on an appropriate support, and (c) drying the thus deposited film in order to evaporate the solvent.

In general, the solvent is a mixture of water and water-miscible organic solvent, e.g. a mixture of water and ethanol when the polymer forming the matrix is polyvinyl alcohol.

The solution can be brought into film form by application by means of a brush, or by any other conventional process. The duration of the drying process, which is generally performed at ambient temperature, is a function of the polymer or copolymer film thickness and ranges between 1 and 48 hours when the film thickness increases from 20 $\mu$m to 1 mm.

In certain cases, particularly for producing materials usable in photovoltaic cells, all the molecules of the organic compound are oriented in the same direction, which can be carried out under an electric field during the drying of the film.

There are numerous applications for the materials according to the invention. Thus, when these materials are exposed to a light beam having a wavelength corresponding to the absorption band of the organic compound included in the matrix, the latter give two light emissions Fa and Fb of different wavelengths when they are illuminated and only the second emission Fa with the greater wavelength remains when the illumination is discontinued.

According to the nature of the compound included, the first emission may or may not be in the visible range, but the second emission is generally in the visible range. Thus, in the case of benzene derivatives, the first emission is in the ultraviolet range whereas, in the case of naphthalene and anthracene derivatives, two emissions are obtained, which are both in the visible range, but which have different colours and life periods.

For example, on illuminating a material constituted by a polyvinyl alcohol film containing a TICT-type compound using a Wood lamp with a power of 150 W with an exciting ray in the ultraviolet range, it is possible to obtain a luminescence of a very intense blue (450 nm), green (550 nm) or orange red (600 nm) as a function of the nature of the compound included. The radiative life $\tau_n$ of this emission is several seconds and the appearance life $\tau_r$ of this emission is substantially 1s.

These life periods $\tau_r$ and $\tau_z$ are very long for fluorescences and permit a non-continuous excitation, which is favourable for energy saving reasons. This can also be suitable for a winking illumination, if the excitation time interval is well calculated.

The very intense nature of the emission, its life, the considerable energy gap between TICT emission and absorption, the transparency of the material in the absence of specific excitation an also be used for producing optical fibres, as well as advertising, audio visual, decorative and similar panels. It is also possible to use the properties of such materials, in order to show to advantage certain points in normal illumination and/or in black light.

Moreover, the materials according to the invention have photoconductive properties, which make them usable for producing photoelectric cells. In addition, they can be used as active materials in photovoltaic cells, e.g. for converting solar energy into electrical energy when the TICT molecules of the film have been oriented by means of an electric field.

BRIEF DESCRIPTION OF THE DRAWINGS

The invention is described in greater detail hereinafter relative to number of illustrative and non-limitative examples and the attached drawings, wherein show.

EXAMPLE 1

This example illustrates the preparation of a material having a polyvinyl alcohol matrix of formula

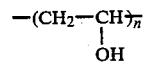

within which is distributed an organic compound constituted by para-N,N-dimethylaminobenzonitrile (DMABN) or compound 1.

90 cc of water and 10 cc of ethanol containing $10^{-2}$ mole.$l^{-1}$ of DMABN are mixed, and heated to boiling. This is followed by the addition of 10 g of polyvinyl alcohol constituted by the product marketed under the trade mark Rhodoviol 33S by Rhône-Poulenc and boiling, accompanied by stirring is maintained for 20 minutes. The solution is then applied by brush to a glass substrate and drying takes place for 1 hour leading to a phosphor layer with a thickness of approximately 50 μm. The film is then washed with n-butyl chloride, followed by drying.

The absorption spectrum of this material is then determined on a Cary 118 Varian spectrometer, together with the emission spectrum under excitation of 310 nm on an Aminco-Bowman spectrofluorimeter. Curves 1 of FIGS. 1 and 2 respectively illustrate the absorption spectrum and the emission spectrum of compound 1.

EXAMPLE 2

This example relates to the preparation of a material incorporating a polyethylene matrix, i.e. polymer having no group able to form hydrogen bonds, in which the same organic compound DMABN is dispersed. A polyethylene film with a thickness of 50 μm is used and DMABN is introduced into this matrix by the dry route, i.e. by contacting the film with DMABN vapour at ambient temperature.

Figure 1:
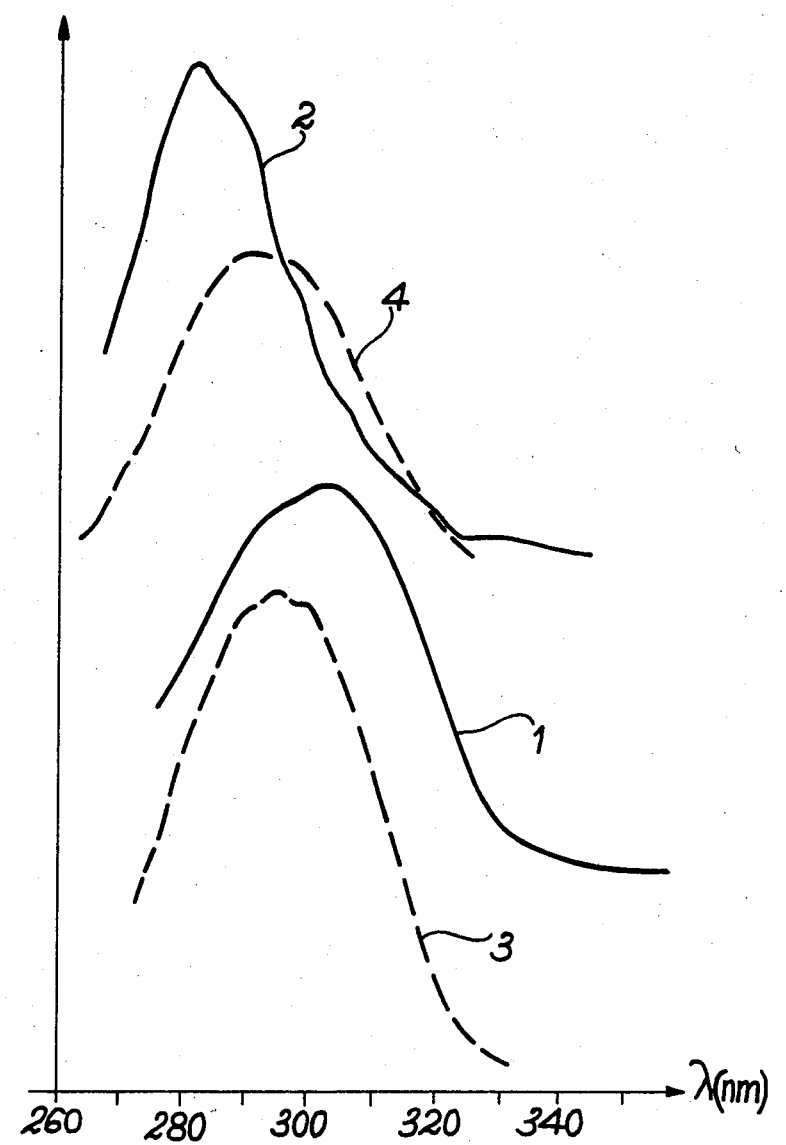
FIG. 1 the absorption spectrum of different materials, whereof only one corresponds to the invention.
Figure 2:
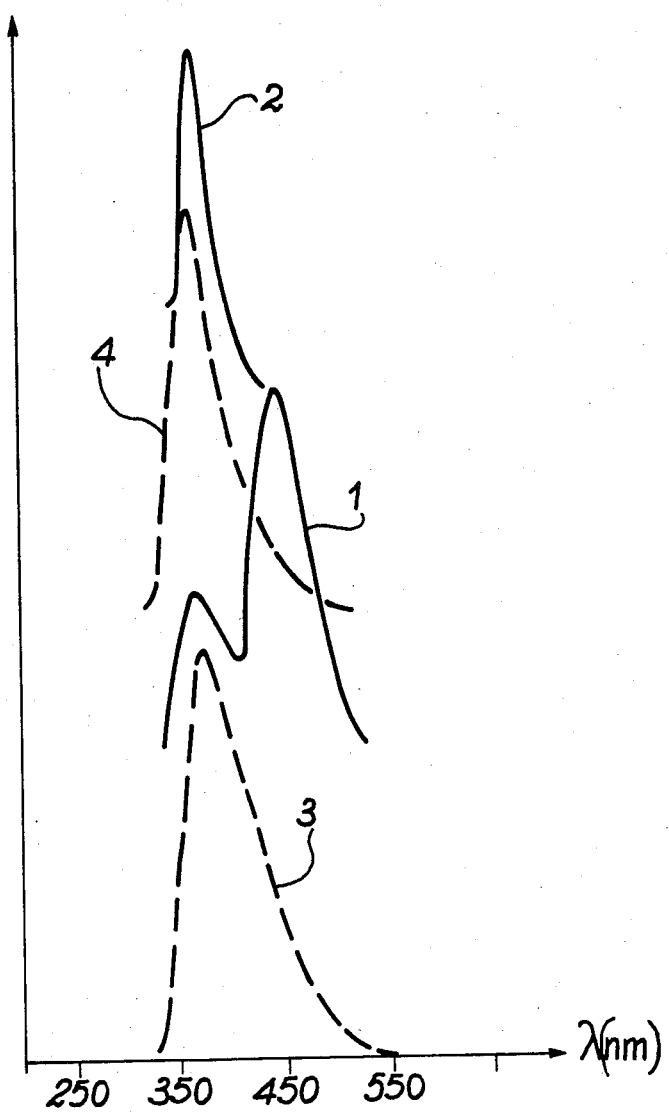
FIG. 2 the fluorescence spectrum of different luminescent materials or phosphors, whereof only one corresponds to the invention.

As in example 1, the absorption spectrum and emission spectrum of the thus obtained material are determined. Curves 2 of FIGS. 1 and 2 illustrate the results obtained.

EXAMPLE 3

A phosphor is prepared, whose matrix is constituted by polyvinyl chloride containing the same compound DMABN. In this case, there is a polyvinyl chloride film with a thickness of 17 μm and DMABN is introduced into this matrix by absorption from a solution of $10^{-2}$ mole.$l^{-1}$ of this compound in n-butyl chloride, followed by the evaporation of the solvent. Washing then takes place with n-butyl chloride, followed by drying.

As hereinbefore, the absorption spectrum and emission spectrum of the thus obtained material are determined. Curves 3 of FIGS. 1 and 2 represent the results obtained.

EXAMPLE 4

This example illustrates the preparation of a luminescent material, whose matrix is constituted by polymethylmethacrylate and which contains DMABN. A polymethylmethacrylate film sold under the trade mark Plexiglass having a thickness of 15 mm is used and DMABN is introduced thereinto by adsorption from an n-butyl chloride solution containing $10^{-2}$ mole.$l^{-1}$ of DMABN, followed by the evaporation of the solvent.

The film is then washed with n-butyl chloride and dried prior to use. The absorption spectrum and emission spectrum are then determined as in example 1. Curves 4 of FIGS. 1 and 2 illustrate the results obtained.

With respect to FIG. 1, it can be seen that the absorption spectrum of DMABZN is at the most displaced by 1000 $cm^{-1}$ when using plastic matrixes not containing hydrogen bonds, which can be explained by the polarity effect of the matrix, which rises from polyethylene to polymethylmethacrylate and to polyvinyl chloride. Conversely, in the case of a polyvinyl alcohol matrix having a lower polarity than polyvinyl chloride, there is a greater displacement of the spectrum, which shows that there is a supplementary effect due to the matrix and which results from the presence of hydrogen bonds. This is also confirmed by the fact that on determining the absorption spectrum at 80° C., i.e. when the polyvinyl alcohol matrix is softened, the latter becomes identical to that obtained with polyvinyl chloride at ambient temperature, due to the fact that the hydrogen bond has been broken at this relatively high temperature.

FIG. 2 shows the emission spectra of the compound DMABN in polyethylene, polyvinyl chloride and polymethylmethacrylate matrixes (curves 2, 3 and 4) having a normal fluorescence which is displaced from 350 to 365 nm, which results from the differing polarity of the matrixes.

However, in the case of a polyvinyl alcohol matrix (curve 1), the fluorescent spectrum has a double fluorescence Fa and Fb and the fluorescence Fa resulting from a TICT state is very intense compared with the fluorescence Fb and has a very long life (several seconds).

Furthermore, it has been proved that the intensity ratio $I_{Fb}/I_{Fa}$ is independent of the DMABN concentration in the matrix over a wide range of concentrations between $10^{-2}$ and $10^{-6}$ mole.$l^{-1}$. Thus, the fluorescence intensity is not due to the concentration of the organic compound and is in fact due to the presence of a hydrogen bond between the compound and the polyvinyl alcohol matrix.

At low temperature, the double fluorescence disappears and at the liquid nitrogen temperature, all that is obtained is the normal fluorescence Fb and the phosphorescence, which corresponds to the results obtained in solution.

Thus, the fluorescence Fa more particularly depends on the presence of hydrogen bonds and not only on the dipole-dipole interactions. Thus, the material having the most polar matrix (polyvinyl chloride) has no fluorescence Fa due to the TICT effect.

EXAMPLE 5

This example relates to the preparation of a material having a polyamide matrix

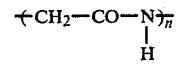

containing DMABN. Polyamide pellets are used, such as those produced from the product sold under the trade mark Nylon Technyl 66 with a thickness of approximately 0.5 mm and they are immersed overnight in a n-butyl chloride solution containing $10^{-3}$ mole.$l^{-1}$ of DMABN. After removing the pellets from the solution, they are dried, washed with n-butyl chloride and then dried again. The emission spectrum of the material obtained is determined, when the latter is excited by a light beam having a wavelength of 310 nm.

Figure 3:
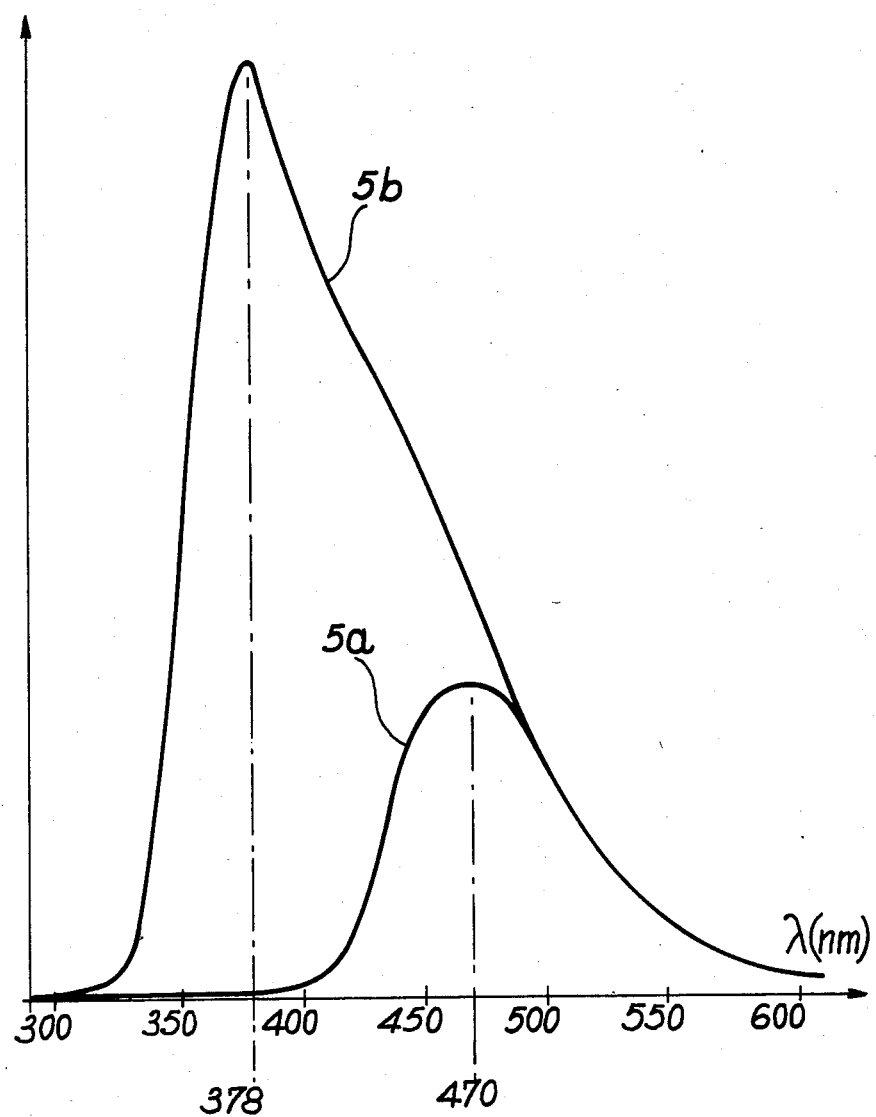
FIG. 3 the emission spectrum of a second material according to the invention.

The results obtained are given in FIG. 3. in which curves 5a and 5b respectively illustrate the emission spectra corresponding to fluorescence FB (curve 5b) and fluorescence Fa (curve 52). The curve corresponding to fluorescence Fa was obtained by phosphoroscope resolution in order to isolate the long life emission spectrum.

EXAMPLE 6

This example relates to the preparation of a material having a polyvinyl alcohol matrix as in examples 1 to 4 and which contains N,N-1-dimethylamino 4-cyano naphthalene, i.e. compound 15.

90 cc of water and 10 cc of ethanol containing $10^{-2}$ mole.$l^{-1}$ of this compound are mixed and the mixture is heated to boiling. 10 g of polyvinyl alcohol constituted by the product sold under the trade mark Rhodoviol 33S by Rhône-Poulenc are added and boiling is maintained, accompanied by stirring, for 20 minutes. The solution is then applied by brush to a glass substrate and drying takes place for 1 hour. This leads to the obtaining of a luminescent material layer with a thickness of approximately 50 μm.

Figure 4:
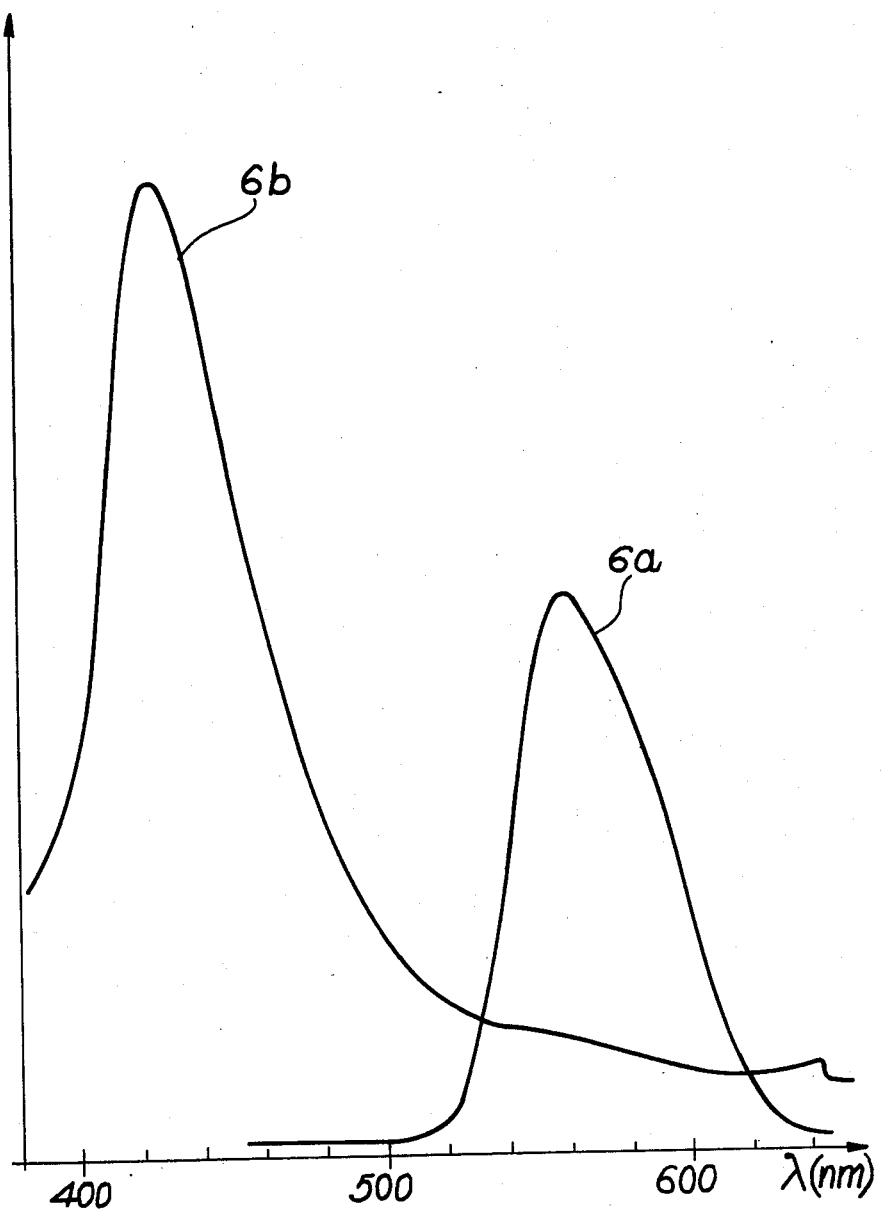
FIG. 4 the emission spectrum of a third material according to the invention.

The emission spectrum of this material is then determined by irradiating it with a light beam having a wavelength of 360 to 380 nm. The results obtained are given in FIG. 4, where curve 6b corresponds to the first emission Fb in the blue at 420 nm and curve 6a to the second emission Fa at 500 nm (yellow), which lasts several seconds.

The photoconductive properties of the luminescent materials according to the invention were also checked. For this purpose, a film of the material according to the invention was deposited on a substrate between two metal grids, to which is applied a d.c. voltage, which can range between 0 and 500 V. On illuminating the film with a light having a wavelength corresponding to the absorption band of the organic compound, a photocurrent is detected.

When the film is constituted by polyvinyl alcohol containing DMABN with a thickness of 20 μm, a current is detected which can range up to 300 mA, wjhen the voltage rises to 500 V. However, when the film is 2 mm thick, the detected current is at the most 1 mA.

The materials according to the invention also have the feature of being usable in energy conversion devices, such as photovoltaic cells. In this case, it is necessary to orient the molecules of the organic compound in the polymer or copolymer matrix and this can be carried out, in the manner described hereinbefore, by placing the film in an electric field before drying. The film in which the molecules of the organic compound have been oriented is then placed between two electrodes connected to an external circuit and on illuminating the film by means of a radiation having a wavelength corresponding to the absorption band of the organic compound, an electric current is produced in the external circuit.

In the case of DMABN in a polyvinyl alcohol matrix, it is possible to obtain a current of 0.06 μA on illuminating with a beam having a wavelength of 310 nm.

What is claimed is:

1. A luminescent material which comprises a solid matrix having groups able to form hydrogen bonds; and an organic compound able to form a twisted intramolecular charge transfer excited state, the organic compound being distributed in the matrix.

2. A material as set forth in claim 1, comprising at least $15.10^{-5}\%$ by weight of said organic compound.

3. A material as set forth in claim 1, wherein the organic compound has the formula:

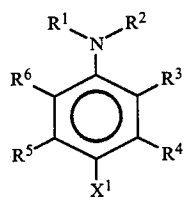
(I)

in which $R^1$ and $R^2$, which can be the same or different, represent an alkyl radical, $R^3$, $R^4$, $R^5$ and $R^6$, which can be the same or different, represent a hydrogen atom, a halogen atom, an alkyl radical or an alkoxy radical and $X^1$ represents —C≡N, —COOR,

—NO₂ or

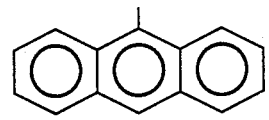

with R representing a hydrogen atom of an alkyl radical, or in wich N, $R_1$ and $R_2$ together from a cyclic radical chosen from among:

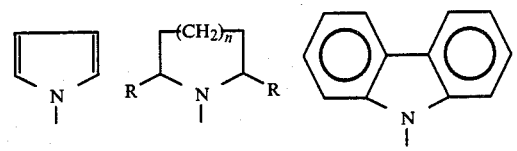

with R representing a hydrogen atom or an alkyl radical and n being equal to 2 or 3.

4. A material as set forth in claim 3, wherein the organic compound is para-N,N-dimethylaminobenzonitrile (DMABN).

5. A material as set forth in claim 1, wherein the organic compound has the formula:

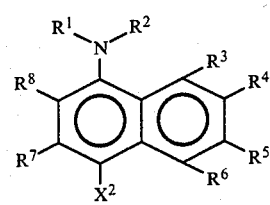
(II)

in which $R^1$ and $R^2$, which can be the same or different, represent an alkyl radical, $R^3$, $R^4$, $R^5$, $R^6$, $R^7$ and $R^8$, which can be the same or different, represent a hydrogen atom, a halogen, an alkyl radical or an alkoxy radical and $X^2$ represents a hydrogen atom —CN, —COOR,

—NO₂ or

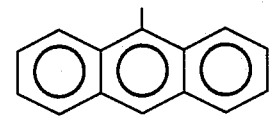

with R representing a hydrogen atom or an alkyl radical, or in which N, $R^1$ and $R^2$ can also together form a cyclic radical chosen from among:

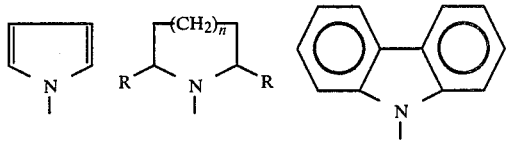

with R representing a hydrogen atom or an alkyl radical and n being equal to 2 or 3, provided that $X^2$ does not represent a hydrogen atom when $R^1$ and $R^2$ are alkyls.

6. A material as set forth in claim 5, wherein the organic compound is N,N-1-bimethylamino-4-cyanonaphthalene.

7. A material as set forth in claim 1, wherein the organic compound has the formula:

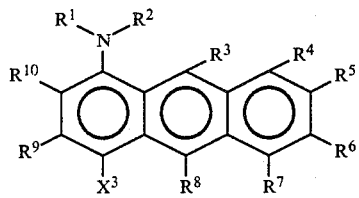 (III)

in which $R^1$ and $R^2$, which can be the same or different, represent an alkyl radical, $R^3$, $R^4$, $R^5$, $R^6$, $R^7$, $R^8$, $R^9$ and $R^{10}$ which, can be the same or different, represent a hydrogen atom, a halogen atom, an alkyl radical or an alkoxy radical and $X^3$ represents a hydrogen atom —CN, —COOR,

—NO$_2$ or

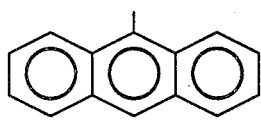

with R representing a hydrogen atom or an alkyl radical, or in which N, $R^1$ and $R^2$ can together form a cyclic radical chosen from among:

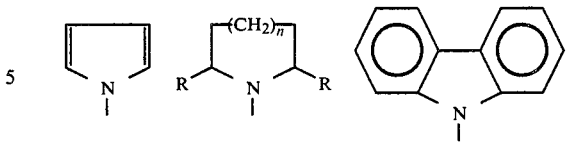

with R representing a hydrogen atom or an alkyl radical and n being equal to 2 or 3 provided that $X^3$ is not a hydrogen atom when $R^1$ and $R^2$ are alkyls.

8. A material according to claim 1, wherein the organic compound has the formula:

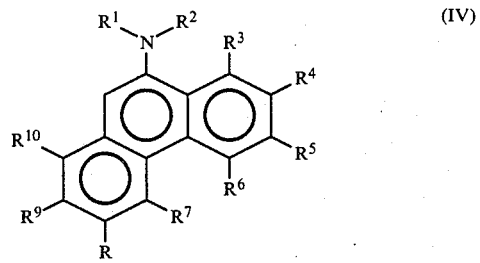 (IV)

in which $R^1$ and $R^2$, which can be the same or different, represent an alkyl radical, $R^3$, $R^4$, $R^5$, $R^6$, $R^6$, $R^8$, $R^9$ and $R^{10}$ represent a hydrogen atom, a halogen atom, an alkyl radical or an alkoxy radical, $X^4$ represents a hydrogen atom —CN, —COOR,

or NO$_2$ with R representing a hydrogen atom or an alkyl radical, or in which N, $R^1$ and $R^2$ together form a cyclic radical chosen from among:

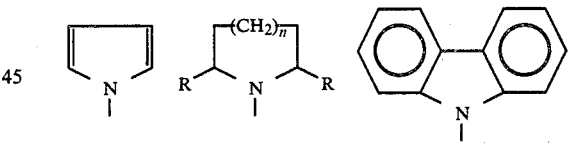

with R representing a hydrogen atom, or an alkyl radical and n being equal to 2 or 3, provided that $X^4$ is not hydrogen when $R^1$ and $R^2$ are alkyls.

9. A material as set forth in any one of the claims 3 to 8, wherein all or part of the hydrogen atoms of the organic compound are replaced by deuterium atoms.

10. A material according to claim 1, wherein the matrix is a polymer or copolymer having —SH, —NH or —OH groups.

11. A material according to claim 1, wherein the matrix is made from glass.

12. A material according to claim 10, wherein the polymer is a polyvinyl alcohol or a polyamide.

13. A material according to claim 1, further comprising traces of at least one compound chosen from the group consisting of heavy water, alkyl iodides and polar solvents.

* * * * *